(12) United States Patent
Balasubramanian

(10) Patent No.: US 6,295,137 B1
(45) Date of Patent: Sep. 25, 2001

(54) METHOD OF COLOR CORRECTION USING MULTI-LEVEL HALFTONING

(75) Inventor: Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/210,006

(22) Filed: Dec. 11, 1998

(51) Int. Cl.$^7$ ........................................... H04N 1/40
(52) U.S. Cl. .................. 358/1.9; 358/456; 358/518; 358/523; 358/534
(58) Field of Search ................ 358/1.9, 456, 457, 358/518, 523, 525, 534, 536; 382/162, 167

(56) References Cited

U.S. PATENT DOCUMENTS

| | | | |
|---|---|---|---|
| 5,377,041 | 12/1994 | Spaulding et al. | 358/518 |
| 5,581,376 | 12/1996 | Harrington | 358/518 |
| 5,689,350 | * 11/1997 | Rolleston | 358/518 |
| 5,692,071 | * 11/1997 | Govaert | 358/167 |
| 5,812,744 | 9/1998 | Allebach et al. | 358/1.9 |
| 5,987,169 | * 11/1999 | Daly et al. | 382/167 |
| 5,991,511 | * 11/1999 | Granger | 358/1.9 |

OTHER PUBLICATIONS

J. P. Allebach, J. Z. Chang and C. A. Bouman, "Efficient Implementation of Nonlinear Color Transformations", IS&T and SID's Color Imaging Conference: Transforms & Transportability of Color (1993)—pp. 143–148.

R. Balasubramaniam, C. A. Bouman, J. P. Allebach, "Sequential Scalar Quantization of Color Images", *Journal of Electronic Imaging*, Jan. 1994, vol. 3(1), pp. 45–49.

Converting Color Values Using Stochastic Interpolation, By Shaun T. Love, Steve F. Weed, Stuart W. Daniel, and Michael E. Lhamon.

* cited by examiner

*Primary Examiner*—Thomas D. Lee
(74) *Attorney, Agent, or Firm*—Fay, Sharpe, Fagan, Minnich & McKee, LLP

(57) ABSTRACT

A method is proposed for reducing the cost of color transformations implemented by multi-dimensional lookup tables, especially in the case where the input space is a luminance-chrominance color space. Multilevel halftoning is applied to the two chrominance coordinates in order to map them to the chrominance node values of the lookup table. Multilevel chrominance halftoning introduces chrominance errors at high spatial frequencies, where the human visual system is insensitive. 1-D interpolation is then applied on the luminance coordinate to obtain the output color value. This method therefore reduces 3-D interpolation to halftoning and 1-D interpolation, thereby saving computational cost without introducing objectionable image error.

12 Claims, 4 Drawing Sheets

1-D INTERPOLATION
ALONG LIGHTNESS

METHOD OF COLOR CORRECTION USING MULTI-LEVEL HALFTONING

BACKGROUND OF THE PRESENT INVENTION

The present invention is directed to the digital imaging arts. It finds particular application to a method of color correction using multi-level halftoning and will be described with particular reference thereto. It is to be appreciated that the present invention can also be applied to any type of color transformation process including color space transformation, device calibration and characterization, color correction, and the like.

Computers and other electronic equipment typically depict color in 3-D coordinates such as RGB. Many printers, on the other hand, print in either three-dimensional colorant space, cyan, magenta, yellow (CMY) or four-dimensional colorant space, cyan, magenta, yellow, and black (CMYK) which correspond to the input values, e.g. RGB. Frequently, a device independent color space is used as an intermediate representation of the image. A common choice for such a device independent space is a luminance-chrominance space, denoted generically as $LC_1C_2$. The L component represents luminance or lightness, and $C_2$ and $C_2$ are the two chrominance coordinates representing red-green and yellow-blue variations, respectively. An example of such a space is CIELAB. Translations are then derived from input RGB to $LC_1C_2$, and from $LC_1C_2$ to printer colorant space.

While this invention is applicable to a wide variety of transformations, the discussion will focus on transforms from a luminance chrominance space $LC_1C_2$ to printer colorant space CMYK. Such transformations are typically implemented by a 3-D look-up table (LUT), which converts each digital $LC_1C_2$ input to the corresponding output CMYK value before being received by the printer.

A printer which has an ideal colorant behavior has a one-to-one correspondence of cyan-to-red, magenta-to-green, and yellow-to-blue. This means that when printed, the cyan colorant will only absorb red light, the magenta colorant will only absorb green light, and the yellow colorant will only absorb blue light. However, typical printer colorants deviate from this ideal behavior, and in fact absorb light in bands of the electromagnetic spectrum other than the intended absorption band. These so called unwanted absorptions lead to interactions between the colorants that result in a complex nonlinear relationship between digital values that drive the printer, and the resulting colorimetric response. A response, or other value, labeled as "colorimetric" refers to a measurement of the printed color, as seen by an average human observer, and represented in a device independent color coordinate system such as CIELAB. Modeling the calorimetric response across the entire range of CMYK values therefore cannot usually be achieved by a simple function, and in fact requires many parameters and measurements. The number of measurements required to characterize the printer adequately, can easily number 1,000 or more. Usually, in order to represent such a complex function at reasonable computational cost, a color correction LUT is built which approximates the mapping between colorimetric space and CMYK values. More specifically, the color correction LUT corrects for non-linearities and unwanted absorptions of colorants. For every input color specified in some luminance-chrominance space $LC_1C_2$, the LUT retrieves the corresponding CMYK which, when printed and measured, will yield the requested $LC_1C_2$ color, provided that this color is within the reproducible gamut of the device.

To build the LUT, a predefined set of CMYK digital values are sent to the printer. The printer prints a corresponding set of color patches. The calibration color patches are measured and a colorimetric $LC_1C_2$ coordinate is determined for each patch, i.e. for each of the predefined CMYK values. Each of the measured $LC_1C_2$ coordinates then, identifies a three-dimensional vector location within the three-dimensional space. Each $LC_1C_2$ coordinate is typically represented by 8-bit values for each of the L, $C_1$, and $C_2$ components. Although such an 24-bit $LC_1C_2$ coordinate is capable of addressing $256^3$ locations, the look-up table is typically partitioned into a smaller size, such as 16×16×16 (4096) table locations, each node of which stores a CMYK value. CMYK values at intermediate $LC_1C_2$ points are determined by some form of interpolation among the LUT nodes. The size of the look-up table is a compromise between the desired accuracy of the look-up table (i.e. the fidelity of the output) and the expense of storing a large number of values. Thus after the calibration patches are produced, each measured $LC_1C_2$ coordinate has a corresponding known CMYK value. Unfortunately, the $LC_1C_2$ coordinates do not, in general, perfectly coincide with the node locations (i.e. the three dimensional intersection points) of the look-up table. Hence, the CMYK values placed at the nodes are estimated by some multidimensional data fitting technique such as Shepard's algorithm.

An illustration of the operation of a look-up table is instructive. Referring to FIG. 1, an input $LC_1C_2$ value 10 is sent into the table 12 for conversion into a printer specific CMYK value. The conversion is accomplished by interpolating the known CMYK values corresponding to the nodes 14 nearest the input $LC_1C_2$ coordinate location 10. Because the color is defined in three dimensions, the interpolation is similarly done in three dimensions. Common examples of 3-D interpolation techniques include trilinear, tetrahedral, and prism interpolation. Of these, tetrahedral interpolation is the fastest method, requiring interpolation only among 4 nodes. (The trilinear and prism schemes utilize 8 and 6 nodes, respectively.) All these techniques require several multiplication, addition, shift, and comparison operations for each output signal at each pixel; and are often implemented with special purpose hardware. This interpolated CMYK value is then output by a printer. Unfortunately, three-dimensional interpolation presents a significant computational burden for many applications.

The present invention provides a new and improved method of color correction which overcomes the above-referenced problems and others.

BRIEF SUMMARY OF THE INVENTION

In accordance with the present invention an improved method is proposed for lookup table based color transformations that combines multilevel halftoning with interpolation Specifically, if the input color space to the lookup table is in luminance-chrominance coordinates, multilevel halftoning is applied to each of the chrominance coordinates to achieve coincidence with the nodes of the lookup table along these two coordinates. The multilevel halftoning step introduces errors at high spatial frequencies in the chrominance channels. However, these errors are not easily perceptible by the human visual system. Finally, 1-dimensional interpolation is performed on the luminance component to obtain the output color values.

In accordance with an aspect of the present invention, a method of color transforming an input color value to an output color value includes a multi-dimensional color transformation table having an arrangement of nodes. Each node defines an output color value. The method includes receiving the input color value and applying multilevel halftoning to a predetermined subset of the input color components to select a plurality of nodes constrained to a selected number of dimensions. Remaining others of the input color components are then used to interpolate among the selected plurality of nodes to obtain the output color value.

In accordance with another aspect of the present invention, the halftoning step includes independently halftoning certain ones of the predetermined subset of input color components to select the plurality of nodes constrained to the selected number of dimensions.

In accordance with another aspect of the present invention, the halftoning includes applying a halftone screen function to ones of the predetermined subset of input colors to select the plurality of nodes.

In accordance with another aspect of the present invention, input color components are defined by L*a*b* components. The halftoning includes halftoning the a* and the b* components to select a plurality of nodes constrained to the L* dimension.

In accordance with another aspect of the present invention, the arrangement of nodes within the color transformation table is nonrectangular.

In accordance with the present invention, an electronic imaging system including a receiver and a conversion processor are provided. The conversion processor includes a multi-dimensional table having a plurality of nodes each containing predefined output color data. A first quantizer receives a predetermined subset of the input color components and identifies nodes constrained to a selected number of dimensions. An interpolator calculates an output color from the predefined color data contained at the nodes identified based on remaining ones of the input color components.

In accordance with another aspect of the present invention, the quantizer comprises a multilevel halftoner applying a halftone screen function to ones of the predetermined subset of input color components, and identifies the nodes constrained to the selected number of dimensions.

In accordance with another aspect of the present invention, the electronic imaging system further includes a second quantizer depending on the nodes identified by the first quantizer to identify the nodes constrained to the selected number of dimensions.

One advantage of the present invention is that the expensive 3-D interpolation is reduced to a much simpler process of halftoning and 1-D interpolation, which brings substantially savings in computation, with minimal loss in visual quality. Another advantage of the present invention is that the halftoning and 1-D interpolation steps require less storage and memory for precomputed quantities in the lookup table. This allows alternative grid structures to be employed for the lookup table.

Still further advantages of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, and in various steps and arrangements of steps. The drawings, then, must be presented for illustrative purposes only and should not be construed as limiting the scope of the present invention, wherein.

DETAILED DESCRIPTION OF THE PREFERRED EMBODIMENTS

A method is provided for reducing the cost of interpolation operations required in 3-D lookup table (LUT) based color correction. The input color value will be described in luminance-chrominance ($LC_1C_2$) coordinates, however, the present invention is equally applicable to other input formats with no loss of functionality. Multilevel halftoning is used to restrict $C_1$ and $C_2$ to a limited set of levels; namely those levels that coincide with the LUT node locations along $C_1$ and $C_2$. The LUT calculation then reduces from 3-D interpolation in $LC_1C_2$ to 1-D interpolation only along L. Testing shows that acceptable images can be obtained, with significant gains in computational cost as compared to the prior art 3D interpolation.

The present invention recognizes that reducing color correction from a 3-D interpolation problem to a one-dimensional problem will significantly reduce the cost and speed of color correction. Typically, device independent image values are stored as luminance-chrominance coordinates, for example the CIELAB color space. Generally, the human visual system is less sensitive to chrominance errors than it is to distortions in luminance at high spatial frequencies. In other words, an observer is more likely to detect small errors in luminance than in chrominance at high spatial frequencies. It is this recognition that is the basis of the present invention.

Figure 2:
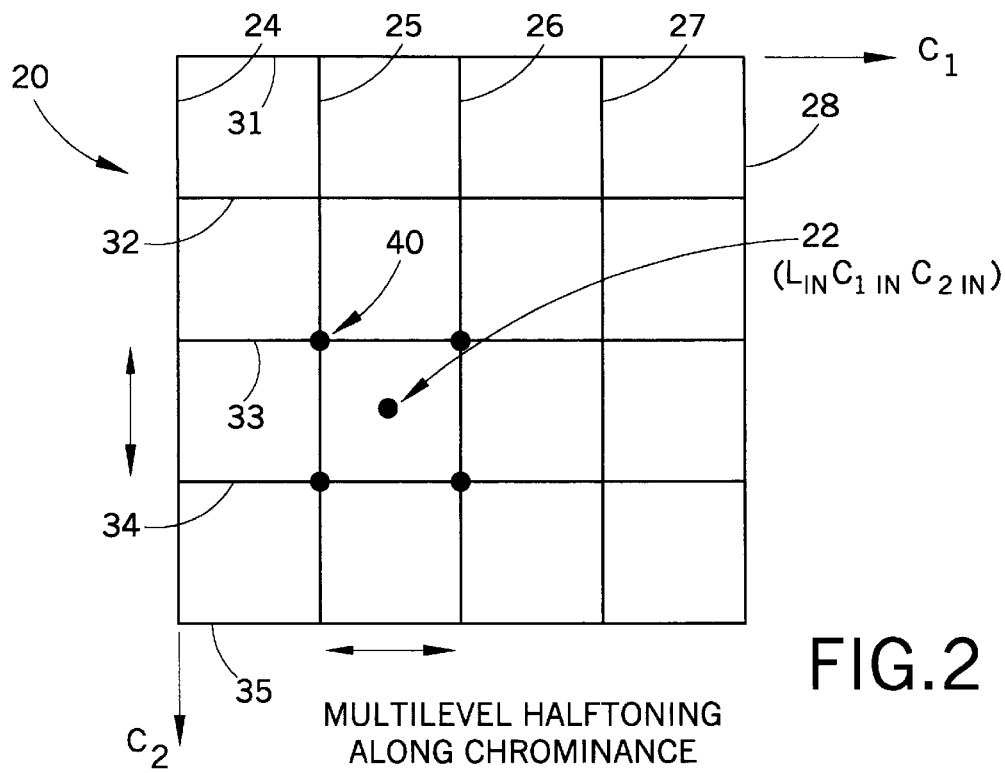
FIG. 2 an illustration of one $C_1 C_2$ plane and an off-node arrival of an input color.

For clarity, a single $C_1$–$C_2$ plane 20 is shown in FIG. 2. Input color 22 comprises input color components $L_{in}$, $C_{1in}$ and $C_{2in}$. To reduce the computational cost of the ensuing color correction operation, some distortion in the $C_1$ and $C_2$ channels is accepted. Accordingly, the $C_1$ component is limited to a finite set of dimensions or levels 24, 25, 26, 27, 28 each coinciding with a plurality of nodes (i.e. along the $C_2$ and L axes). Similarly, the $C_2$ component is constrained to match levels 31, 32, 33, 34, 35. One skilled in the art can appreciate that if an input color value is forced to always coincide with a level or a predefined dimension in the LUT, then there is no need to perform interpolation along that dimension. In other words, of the three input components, two ($C_1$ and $C_2$) have been determined through multilevel halftoning. Hence, the color correction reduces to 1-D interpolation along the remaining axis (e.g. luminance or L) as will be shown below.

Figure 1:
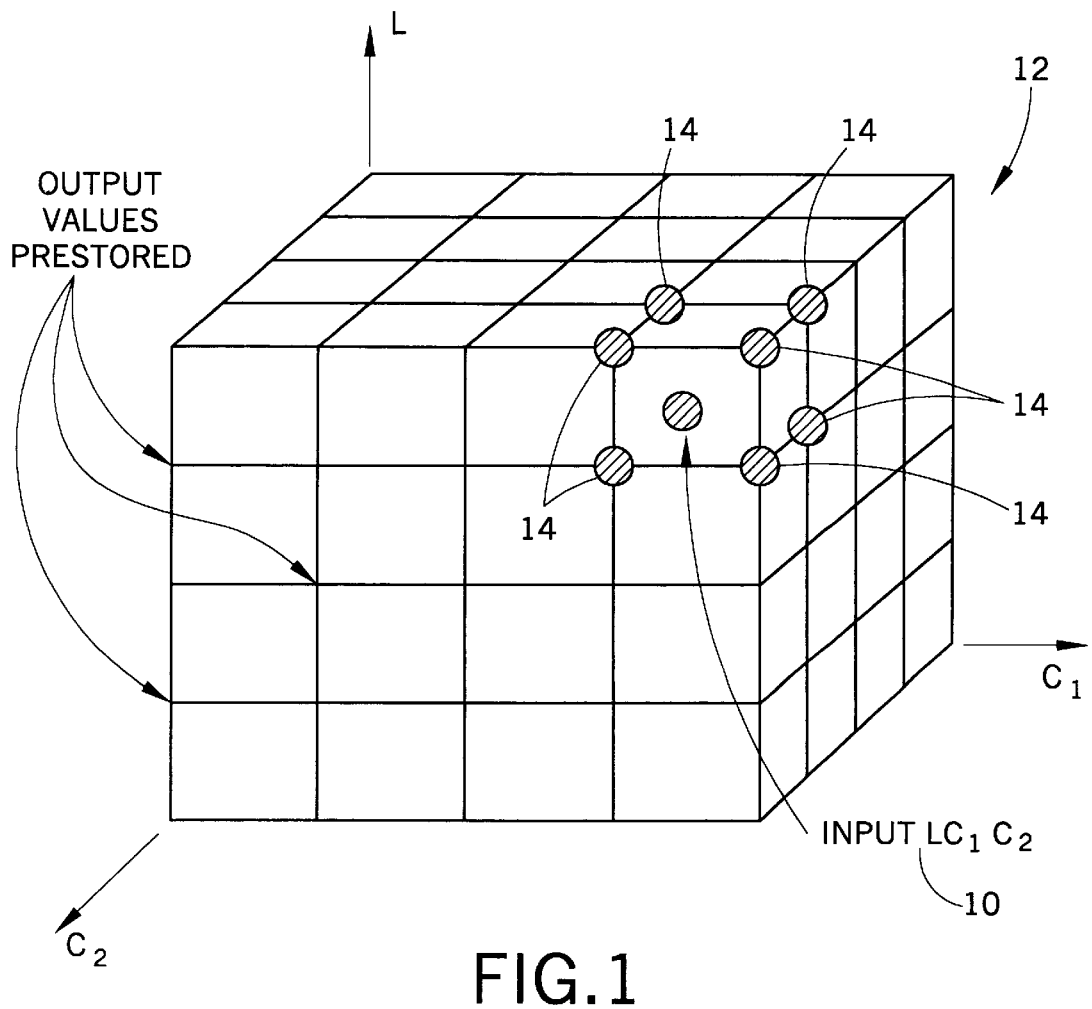
FIG. 1 is a graphic depiction of the prior art three-dimensional interpolation look up table.

Reducing the precision of a signal to a small set of levels or dimensions is a quantization problem. A typical color correction LUT would assign 16 node locations along each of the L, $C_1$ and $C_2$ dimensions (from FIG. 1) resulting in a total of $16^3$=4096 node entries. Thus, for a typical 8-bit input, the present invention requires for each chrominance channel, a quantization mapping from 256 possible input levels to the 16 output node locations. Straightforward quantization involves mapping each input value to the closest node. However, experiments show that this approach can result in objectionable contouring artifacts.

A method of minimizing such artifacts in the quantized image is through dithering, or more generally, multilevel halftoning. This effectively pushes quantization errors into high spatial frequencies, exploiting another insensitivity in the human visual system. Preferably then, halftoning is applied to the chrominance channels $C_1$ and $C_2$ at high spatial frequencies thus, exploiting the greatly reduced sensitivity of the human visual system to high frequency chrominance errors. There are two known methods of multilevel halftoning: screening and error diffusion. The present invention preferably employs a blue noise stochastic screen, as it enjoys the computational ease of any screening technique, and borrows some of the more desirable qualitative behavior from error diffusion. An equally viable alternative is to use a dispersed dot screen. Still referring to FIG. 2, the halftoning operation can be envisioned as an input color 22 entering the LUT. As is typical, the input color 22 lies between the predefined levels 24–28 and 31–35 on both the $C_1$ and $C_2$ axes. Starting with $C_1$, a determination is made whether to place the input color 22 on either a slightly lower level 25 or a slightly higher level 26. No interpolation is performed, the input color is "forced" onto one of the levels, thus inducing an error. A similar determination is made for $C_2$ forcing the input color 22 onto either the lower level 33 or the higher level 34. Assume for illustration purposes, the thresholding placed the input color on node 40.

Figure 3:
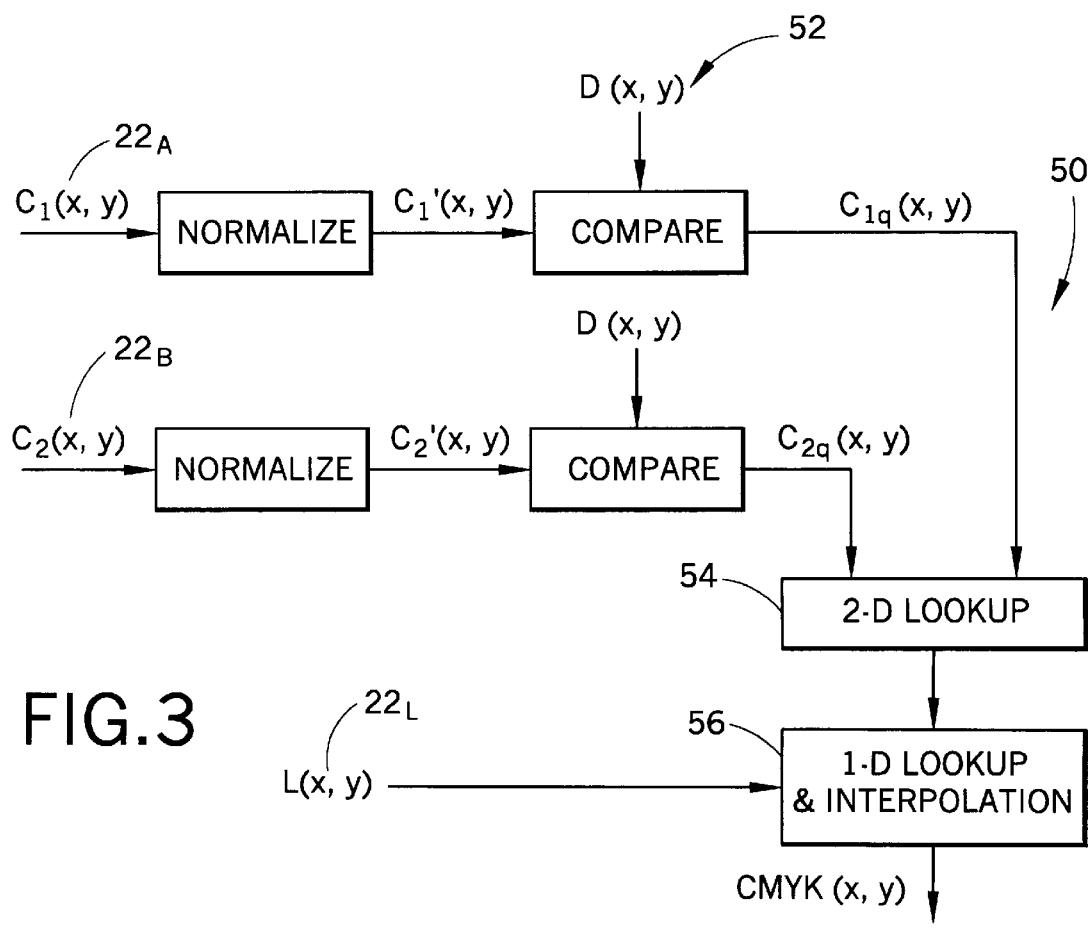
FIG. 3 is a graphical depiction of a logical flow diagram in accordance with an embodiment of the present invention.

As seen in FIG. 3, a conversion processor 50 receives the input color 22 comprising three components i.e. L $22_L$, $C_1$ $22_A$ and $C_2$ $22_B$. In the illustrated embodiment, $C_1$ $22_A$ and $C_2$ $22_B$ are quantized independent of each other. The first step in multilevel halftoning is to normalize the coordinate $C_1(x, y)$ $22_A$ at pixel (x, y) within the interval formed by the two neighboring nodes (e.g. levels 22 and 23 from FIG. 2) in the LUT along the $C_1$. The normalized coordinate $C_1'$ is obtained by $$C_1'(x,y)=[C_1(x,y)-C_{1L}(x,y)]/[C_{1G}(x,y)-C_{1L}(x,y)] \quad \text{Equation (1)}$$

where $C_1(x, y)$ is the original input coordinate; $C_{1L}(x, y)$ is the nearest LUT node less than $C_1(x, y)$; and $C_{1G}(X, y)$ is the nearest LUT node greater than $C_1(x, y)$. The normalized coordinate $C_1'(x, y)$ therefore always lies between 0 and 1. Note that the normalization operation can alternately be carried out ahead of time and stored in a 1-D lookup table array. The normalized value $C_1'(x, y)$ is then compared with the halftone screen threshold value, otherwise termed the dither signal D(x, y) 52, which is also normalized between 0 and 1. If $C_1'(x, y)$ is less than or equal to D(x, y), then $C_{1L}(x, y)$ is picked as the output halftoned level, otherwise $C_{1G}(x, y)$ is chosen. This output level is denoted $CC_{1q}$. An identical operation is performed for $C_2(x, y)$ $22_B$.

Figure 4:
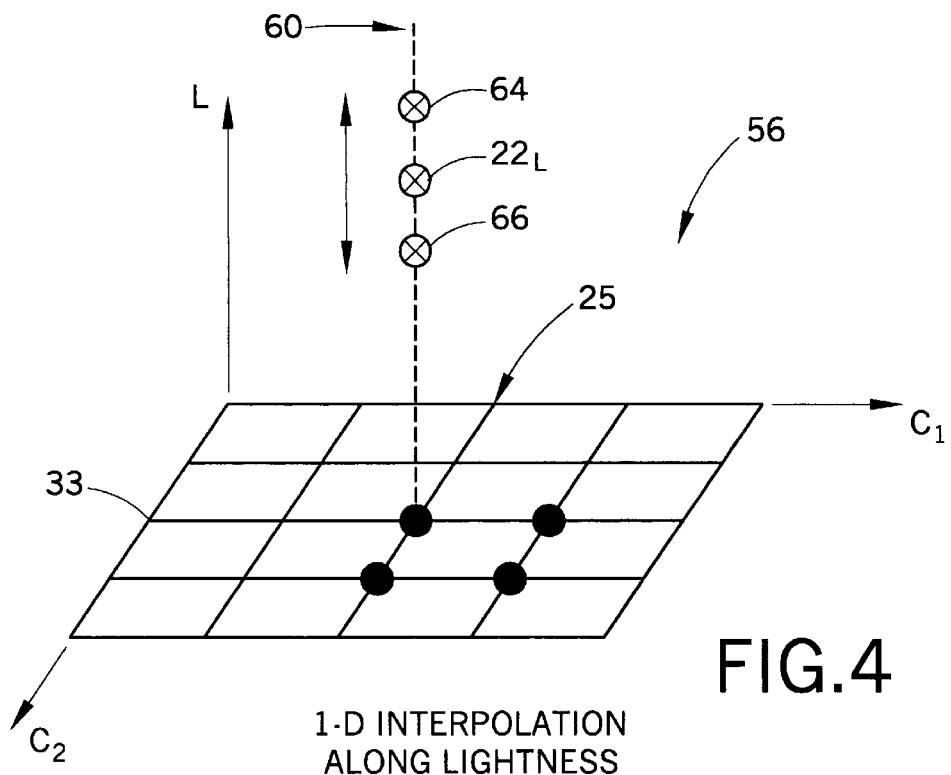
FIG. 4 is an illustration of interpolation along a remaining dimension following multilevel halftoning on the other dimensions.

At this point, and with cross-reference to FIG. 4, the quantized values or dimensions 25 and 33 enter a 2-D lookup able 54 (FIG. 3) to determine a luminance line 60 defined by the intersection of the quantized $C_1$ chrominance level or plane, e.g. 25 and the $C_2$ chrominance level or plane 33. The result passes to the 1-D lookup and interpolation device 56 so that the L component of the input color $22_L$ can be interpolated (in 1-D) based on the remaining dimension (i.e. L) between the two nodes 64, 66 surrounding the input color value 22, thus determining the output color.

Figure 5:
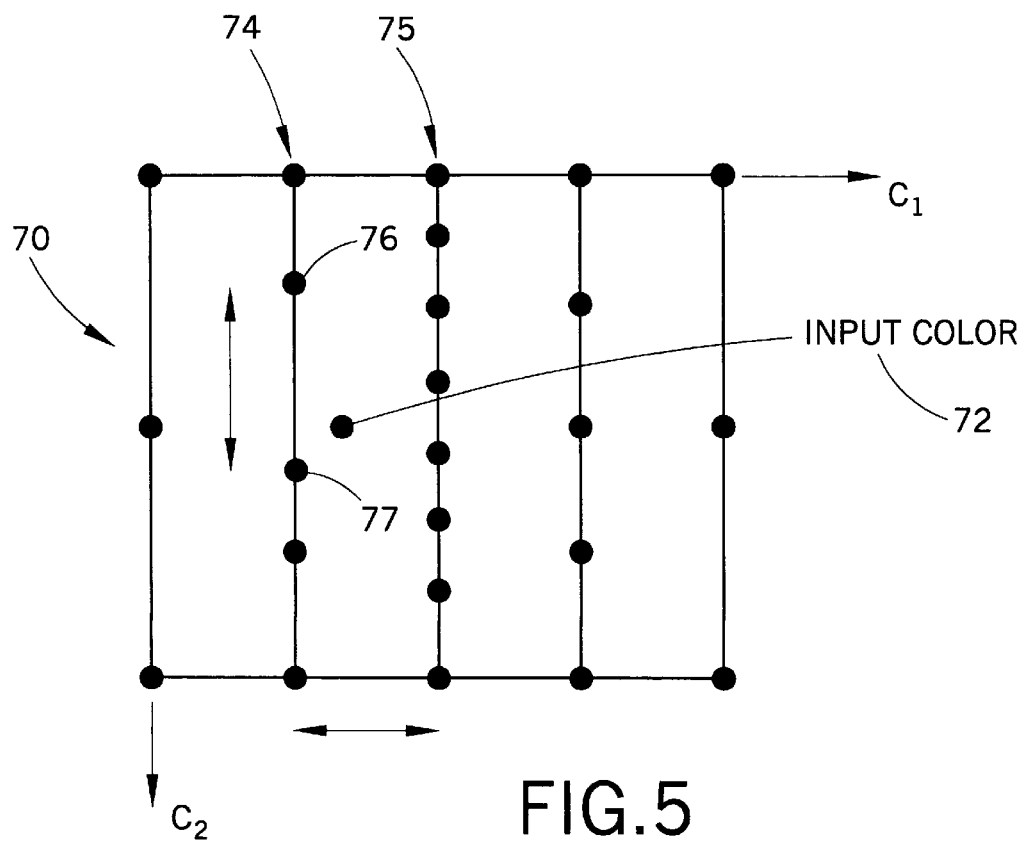
FIG. 5 is graphical depiction of a sequential grid according to the present invention.

Referring now to FIG. 5, an alternative embodiment employs a sequential grid 70 to be used as an alternative to that shown in FIG. 2 for the 2-D chrominance plane in the 3-D LUT. The sequential grid 70 allows for a more flexible placement of nodes in the $C_1$–$C_2$ plane, than the strictly rectangular grid placement as seen in FIG. 2. It allows nodes to be placed where the LUT transformation has greatest variation or visual importance, and in general, will result in a better trade-off between LUT accuracy and LUT size. In this embodiment, multilevel halftoning is applied to the first chrominance coordinate of the input color 72. This maps the $C_1$ value or component to one of the levels 74 or 75. In the given example, the halftoning process constrains the possible nodes to the two-dimensional space defined by level 74. In the next step, multilevel halftoning is applied in the $C_2$ dimension along the level 74 between nodes 76 and 77. In the given example, this results in the input color being mapped to node 77. Finally, as with the original embodiment, a 2-D lookup, followed by 1-D interpolation along the L axis is applied to obtain the output color.

Figure 6:
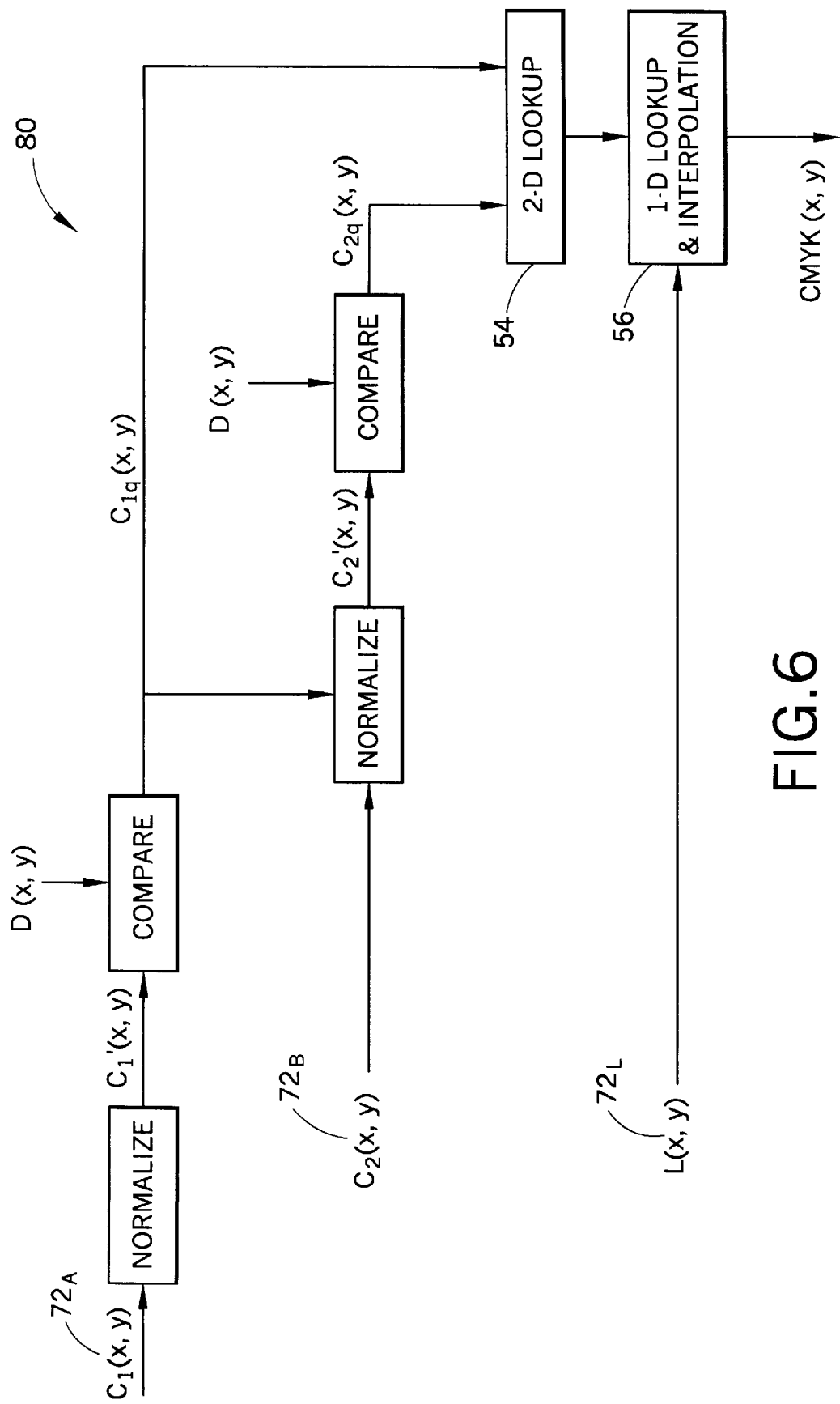
FIG. 6 is a graphical depiction of a logical flow diagram in accordance with an alternate embodiment of the present invention.

A diagram of a conversion processor 80 according to this alternate embodiment process is given in FIG. 6. The flow processor 80 is identical in all essential respects to that of the original embodiment processor 50 (illustrated in FIG. 3) except that the halftoned output $C_{1q}$ along the first dimension is used to determine the set of LUT nodes along the second axis $C_2$, which may be different for different node values along $C_1$. Hence, the halftoning is carried out sequentially, rather than independently along the two chrominance axes.

In Table 1, three methods, trilinear interpolation, tetrahedral interpolation, and the original embodiment of the present invention, are compared in terms of the computations required to perform the color correction operation at each pixel, for N output colors. This operation includes 1) retrieving the nodes of the sub-cell enclosing the input color; and 2) performing the actual interpolation. Note that for the present invention, the comparison step in the multilevel halftoning operation has been included in the cost analysis. In all three cases, any quantities that do not depend on the input color are assumed to be precomputed and stored. These quantities include differences between output values at adjacent nodes, and the normalization of input values given by Equation (1). The last row of Table 1 shows the savings achieved by applying the present invention over tetrahedral interpolation. The savings would be even larger in comparison to trilinear interpolation.

TABLE 1

Cost analysis for trilinear, tetrahedral, and proposed interpolation schemes, for N output signals.

| | Multiplications | Additions | Comparisons | Shifts |
|---|---|---|---|---|
| 1) Trilinear | 7N | 7N + 2 | 0 | 2 |
| 2) Tetrahedral | 3N | 3N + 2 | 2.5 | 2 |
| 3) Proposed Method | N | N + 2 | 2 | 2 |
| 4) Savings from (2) to (3) for N = 4 | 67% | 57% | 20% | 0% |

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the preferred embodiment of the invention, I now claim:

1. A method of color transforming an input color value to an output color value in a digital imaging system which includes a multi-dimensional color transformation table, the color transformation table including an arrangement of nodes, each node defining an output color value, the method comprising the steps of:

receiving the input color value comprising a set of input color components;

applying multilevel halftoning to a predetermined subset of the input color components to select a plurality of nodes constrained to a selected number of dimensions; and using remaining others of the input color components to interpolate among the selected plurality of nodes to obtain the output color value.

2. The method of color transforming as set forth in claim 1 wherein the halftoning includes:

independently halftoning ones of the predetermined subset of input color components to select the plurality of nodes constrained to the selected number of dimensions.

3. The method of color transforming as set forth in claim 1 wherein the halftoning includes:

applying a halftone screen function to ones of the predetermined subset of input color components to select the plurality of nodes.

4. The method of color transforming as set forth in claim 3 wherein the halftoning includes:

halftoning all but one of the input color components to select the plurality of nodes.

5. The method of color transforming as set forth in claim 4 wherein the input color components are defined by a luminance and two chrominance components, the halftoning including:

halftoning the chrominance components to select a plurality of nodes constrained to a luminance dimension.

6. The method of color transforming as set forth in claim 5 wherein the input color components are defined by L*a*b* components, the halftoning including:

halftoning the a* and the b* components to select a plurality of nodes constrained to the L* dimension.

7. The method of color transforming as set forth in claim 1 wherein the arrangement of nodes in the color transformation table are distributed in a rectangular grid structure.

8. The method of color transforming as set forth in claim 1 wherein the arrangement of nodes in the color transformation table are distributed in a non-rectangular grid structure.

9. In an electronic imaging system which includes a receiver for receiving a set of input color components defining an input color, a conversion processor converting the input color to an output color, and image output apparatus for producing the output color on an output medium, the conversion processor comprising:

a multi dimensional table having a plurality of nodes containing predefined output color data;

a normalizer for determining a normalized value of ones of a subset of input color components;

a comparator for comparing the normalized value to a threshold and identifying a plurality of nodes in the table based on the comparison; and an interpolator for calculating an output color from the predefined color data contained at the nodes identified based on remaining ones of the input color components.

10. An imaging system which receives a set of input color components defining an input color, and outputs a set of output color components defining an output color, the system comprising:

a multi dimensional memory having a plurality of nodes containing predefined output color data;

a multilevel halftoner applying a halftone screen function to ones of a predetermined subset of input color components and identifying nodes in the memory; and an interpolator for interpolating an output color component from the identified nodes based on remaining input color components.

11. In an electronic imaging system which includes a receiver for receiving a set of input color components defining an input color, a conversion processor converting the input color to an output color, and image output apparatus for producing the output color on an output medium, the conversion processor comprising:

a multi dimensional table having a plurality of nodes containing predefined output color data;

a first quantizer receiving an input color component and identifying nodes in the multi dimensional table constrained to a number of dimensions;

a second quantizer receiving another input color component and identifying nodes in the multi dimensional table constrained to another number of dimension; and an interpolator for interpolating between output color components located at the identified nodes based on remaining input color components.

12. The electronic imaging system as set forth in claim 11 where the image output apparatus comprises an item selected from the set of copiers, printers and facsimile machines.

* * * * *